United States Patent
Lee et al.

(10) Patent No.: US 9,210,657 B2
(45) Date of Patent: Dec. 8, 2015

(54) OPERATION WITH VARIOUS TIMERS IN A WIRELESS COMMUNICATION SYSTEM

(71) Applicant: LG ELECTRONICS INC., Seoul (KR)

(72) Inventors: Sunyoung Lee, Anyang-si (KR); Sungjun Park, Anyang-si (KR); Seungjune Yi, Anyang-si (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 14/730,774

(22) Filed: Jun. 4, 2015

(65) Prior Publication Data
US 2015/0271752 A1 Sep. 24, 2015

Related U.S. Application Data

(63) Continuation of application No. 14/063,608, filed on Oct. 25, 2013, now Pat. No. 9,078,148.

(60) Provisional application No. 61/719,477, filed on Oct. 28, 2012.

(51) Int. Cl.
| | |
|---|---|
| G08C 17/00 | (2006.01) |
| H04W 52/02 | (2009.01) |
| H04W 76/04 | (2009.01) |
| H04W 76/06 | (2009.01) |
| H04L 1/18 | (2006.01) |

(Continued)

(52) U.S. Cl.
CPC .......... *H04W 52/0216* (2013.01); *H04L 1/1812* (2013.01); *H04W 24/02* (2013.01); *H04W 52/0219* (2013.01); *H04W 52/0229* (2013.01); *H04W 74/0833* (2013.01); *H04W 76/048* (2013.01); *H04W 76/068* (2013.01)

(58) Field of Classification Search
None
See application file for complete search history.

(56) References Cited

U.S. PATENT DOCUMENTS 8,305,961 B2 11/2012 Kuo
8,913,518 B2 * 12/2014 Heo et al. ............... 370/252

(Continued)

FOREIGN PATENT DOCUMENTS

EP 2 152 040 A1 2/2010
JP 2012-507891 A 3/2012

(Continued)

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 11)," 3GPP TS 36.321 V11.0.0, Sep. 2012, pp. 1-55.

(Continued)

*Primary Examiner* — Duc C Ho
(74) *Attorney, Agent, or Firm* — Birch, Stewart, Kolasch & Birch, LLP

(57) ABSTRACT

Operation of a user equipment (UE) with various timers is discussed. According to this scheme, when the UE receives values for each of timers related with a discontinuous reception (DRX) operation from a network, the UE monitors a physical downlink control channel (PDCCH) from subframe n+1 to subframe n+X based on a first timer among the above mentioned timers when a first event for starting the first timer occurs at the subframe n, and monitors the PDCCH from subframe n to subframe n+X−1 based on a second timer among said timers, when a second event for starting the second timer occurs at the subframe n.

10 Claims, 9 Drawing Sheets

(51) Int. Cl.
*H04W 74/08* (2009.01)
*H04W 24/02* (2009.01)

(56) References Cited

U.S. PATENT DOCUMENTS

| | | |
|---|---|---|
| 2009/0285141 A1 | 11/2009 | Cai et al. |
| 2011/0002281 A1 | 1/2011 | Terry et al. |
| 2011/0205928 A1 | 8/2011 | Pelletier et al. |
| 2011/0268003 A1 | 11/2011 | Li et al. |
| 2011/0292854 A1 | 12/2011 | Terry et al. |
| 2011/0294491 A1 | 12/2011 | Fong et al. |
| 2012/0082077 A1 | 4/2012 | Zhang et al. |
| 2012/0176950 A1 | 7/2012 | Zhang et al. |
| 2012/0207070 A1* | 8/2012 | Xu et al. ............. 370/311 |
| 2012/0281600 A1 | 11/2012 | Tseng et al. |
| 2013/0194990 A1 | 8/2013 | Banister et al. |
| 2014/0029563 A1* | 1/2014 | Kim et al. ............. 370/329 |
| 2014/0295820 A1* | 10/2014 | Kim et al. ............. 455/418 |
| 2015/0201375 A1* | 7/2015 | Vannithamby et al. ....... 370/311 |

FOREIGN PATENT DOCUMENTS

| | | |
|---|---|---|
| KR | 10-2009-0077699 A | 7/2009 |
| WO | WO 2011/038625 A1 | 4/2011 |

OTHER PUBLICATIONS

Nokia Siemens Networks et al., "Inactivity Timer Expiry and Short DRX Cycle," 3GPP TSG-RAN WG2 Meeting #79bis, Agenda Item 6, R2-124421, Bratislava, Slovakia, Oct. 8-12, 2012, 5 pages.

* cited by examiner (a) contol - plane protocol stack (b) user - plane protocol stack

OPERATION WITH VARIOUS TIMERS IN A WIRELESS COMMUNICATION SYSTEM

CROSS REFERENCE

This application is a Continuation of copending application Ser. No. 14/063,608, filed on Oct. 25, 2013, which claims priority under 35 U.S.C. §119(e) to U.S. Provisional Application No. 61/719,477, filed on Oct. 28, 2012, all of which are hereby expressly incorporated by reference into the present application.

BACKGROUND OF THE INVENTION

1. Field of the Invention

The present invention relates to a wireless communication system, and more particularly, to methods for an operation with various timers and apparatuses therefor.

2. Discussion of the Related Art

As an example of a wireless communication system to which the present invention is applicable, a 3rd generation partnership project (3GPP) long term evolution (LTE) communication system will be schematically described.

FIG. 1 is a schematic diagram showing a network structure of an evolved universal mobile telecommunications system (E-UMTS) as an example of a wireless communication system. The E-UMTS is an evolved form of the legacy UMTS and has been standardized in the 3GPP. In general, the E-UMTS is also called an LTE system. For details of the technical specification of the UMTS and the E-UMTS, refer to Release 7 and Release 8 of "3rd Generation Partnership Project; Technical Specification Group Radio Access Network".

Referring to FIG. 1, the E-UMTS includes a user equipment (UE), an evolved node B (eNode B or eNB), and an access gateway (AG) which is located at an end of an evolved UMTS terrestrial radio access network (E-UTRAN) and connected to an external network. The eNB may simultaneously transmit multiple data streams for a broadcast service, a multicast service and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

SUMMARY OF THE INVENTION

Accordingly, the present invention is directed to methods for operating with various timers and apparatuses therefor that substantially obviates one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for a user equipment (UE) to save power in a wireless communication system, the method comprising: receiving values (X) for each of timers related with a discontinuous reception (DRX) operation from a network; monitoring a physical downlink control channel (PDCCH) from subframe n+1 to subframe n+X based on a first timer among said timers, when a first event for starting the first timer occurs at the subframe n; and monitoring the PDCCH from subframe n to subframe n+X−1 based on a second timer among said timers, when a second event for starting the second timer occurs at the subframe n, is presented.

Here, the first event may comprise receiving a PDCCH indicating a new transmission, and the first timer may comprise a DRX inactivity timer.

Also, the first event may comprises transmitting a message 3 of a random access procedure, and the first timer may comprise a medium access control (MAC) contention resolution timer.

On the other hand, the second event may comprise a case when a hybrid automatic repeat request retransmission timer (HARQ RTT timer) expires at the subframe n and data of a corresponding HARQ process was not successfully decoded, and the second timer may comprise a DRX retransmission timer.

Also, the second event may comprise a case when system frame number meets a predetermined condition with regards to a DRX cycle, and the second timer may comprise on duration timer.

The DRX cycle may be based on either a long DRX cycle or a short DRX cycle, and, if the received value for a DRX short cycle timer is X, the UE may use the short DRX cycle during a period starting from the subframe n and ending on the subframe n+X−1, and may start to use the long DRX cycle on the subframe n+X, when a DRX inactivity timer expires or a DRX command MAC control element is received on the subframe n.

The method may further comprises monitoring the PDCCH from the subframe n+1 to subframe n+Y based on the first timer, when the first event for starting the first timer occurs at the subframe n and if the wireless communication system operates in a time divisional duplex (TDD) mode; and monitoring the PDCCH from the subframe n to subframe n+Y−1 based on the second timer, when the second event for starting the second timer occurs at the subframe n and if the wireless communication system operates in the TDD mode.

Here, the Y may correspond to minimum number of subframes so that X subframes having a physical downlink control channel (PDCCH) are included within a first period starting from the subframe n+1 and ending on the subframe n+Y or within a second period starting from the subframe n and ending on the subframe n+Y−1, respectively.

According to another aspect of the invention, a user equipment for saving power in a wireless communication system, the UE comprising: a transceiver adapted to transmit or receive signals over the air; a microprocessor electrically connected to the transceiver and adapted to control the transceiver to: monitor a physical downlink control channel (PDCCH) from subframe n+1 to subframe n+X based on a first timer among timers related with a discontinuous reception (DRX) operation, when a first event for starting the first timer occurs at the subframe n; and monitor the PDCCH from subframe n to subframe n+X−1 based on a second timer among said timers, when a second event for starting the second timer occurs at the subframe n, wherein X collectively represents values received from a network for each of said timers, is provided.

Here, the first event may comprises receiving a PDCCH indicating a new transmission, and the first timer may comprise a DRX inactivity timer.

Also, the first event may comprise transmitting a message 3 of a random access procedure, and the first timer may comprise a medium access control (MAC) contention resolution timer.

On the other hand, the second event may comprise a case when a hybrid automatic repeat request retransmission timer (HARQ RTT timer) expires at the subframe n and data of a corresponding HARQ process was not successfully decoded, and the second timer may comprise a DRX retransmission timer.

Also, the second event may comprise a case when system frame number meets a predetermined condition with regards to a DRX cycle, and the second timer may comprise on duration timer.

The DRX cycle may be based on either a long DRX cycle or a short DRX cycle. And, if the received value for a DRX short cycle timer is X, the microprocessor may use the short DRX cycle during a period starting from the subframe n and ending on the subframe n+X−1, and may start to use the long DRX cycle on the subframe n+X, when a DRX inactivity timer expires or a DRX command MAC control element is received on the subframe n.

The microprocessor may be further adapted to: monitor the PDCCH from the subframe n+1 to subframe n+Y based on the first timer, when the first event for starting the first timer occurs at the subframe n and if the wireless communication system operates in a time divisional duplex (TDD) mode; and monitor the PDCCH from the subframe n to subframe n+Y−1 based on the second timer, when the second event for starting the second timer occurs at the subframe n and if the wireless communication system operates in the TDD mode, wherein the Y corresponds to minimum number of subframes so that X subframes having a physical downlink control channel (PDCCH) are included within a first period starting from the subframe n+1 and ending on the subframe n+Y or within a second period starting from the subframe n and ending on the subframe n+Y−1, respectively.

In another aspect of the present invention, a method for a user equipment (UE) operating in a wireless communication system, the method comprising: receiving a value (X) for a timer related with a discontinuous reception (DRX) operation from a network; and monitoring a physical downlink control channel (PDCCH) from subframe n+1 to subframe n+X based on the timer, when an event for starting the timer occurs at the subframe n, is provided.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE INVENTION

The configuration, operation and other features of the present invention will be understood by the embodiments of the present invention described with reference to the accompanying drawings. The following embodiments are examples of applying the technical features of the present invention to a 3rd generation partnership project (3GPP) system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
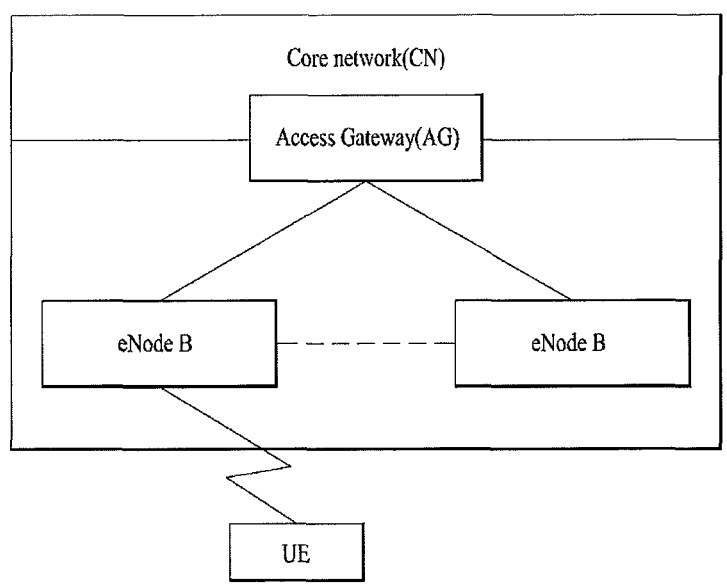
FIG. 1 is a diagram showing a network structure of an Evolved Universal Mobile Telecommunications System (E-UMTS) as an example of a wireless communication system.
Figure 2:
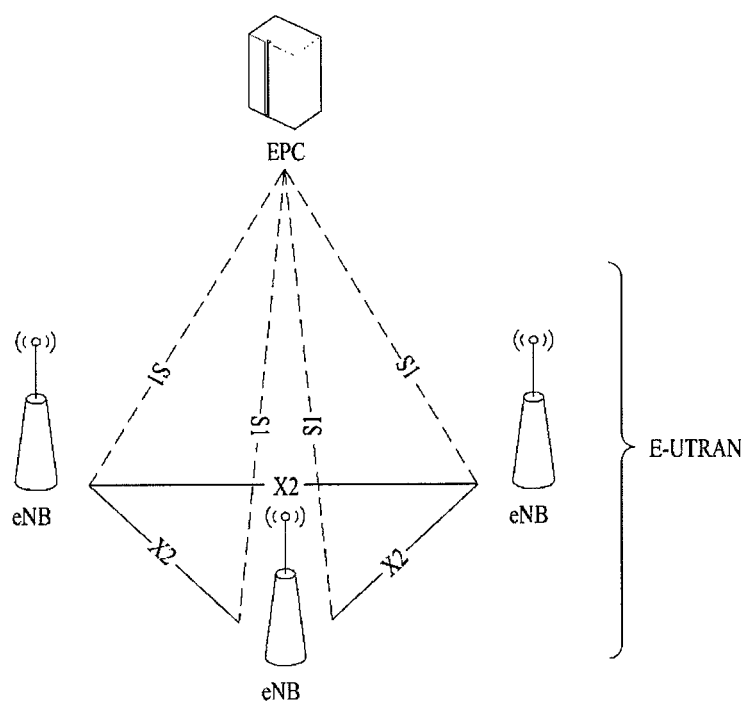
FIG. 2 is a diagram conceptually showing a network structure of an evolved universal terrestrial radio access network (E-UTRAN).

FIG. 2 is a diagram conceptually showing a network structure of an evolved universal terrestrial radio access network (E-UTRAN). An E-UTRAN system is an evolved form of a legacy UTRAN system. The E-UTRAN includes cells (eNB) which are connected to each other via an X2 interface. A cell is connected to a user equipment (UE) via a radio interface and to an evolved packet core (EPC) via an S1 interface.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
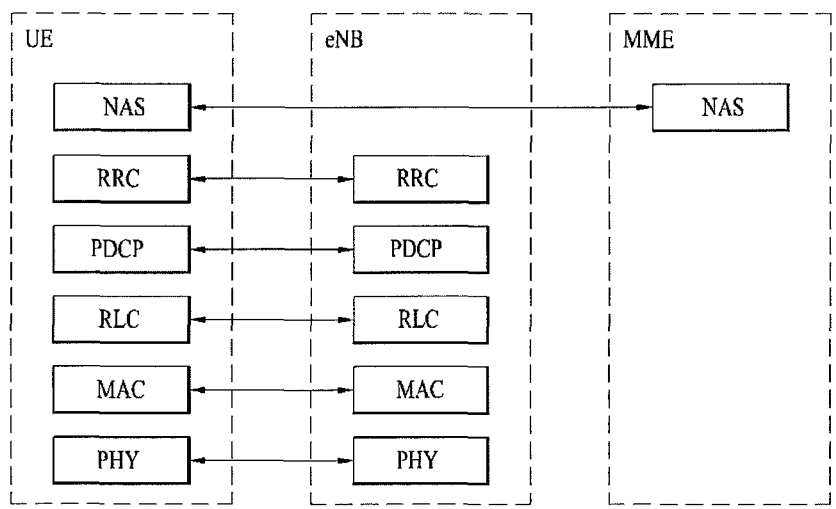
FIG. 3, including (a) and (b), is a diagram showing a control plane and a user plane of a radio interface protocol between a UE and an E-UTRAN based on a 3rd generation partnership project (3GPP) radio access network standard.
Figure 3:
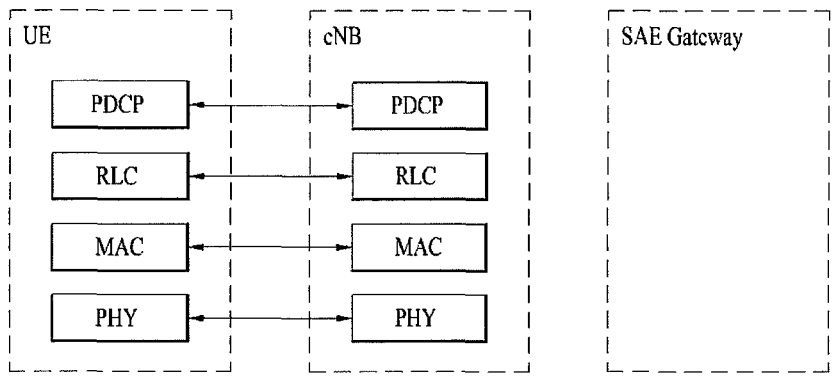

FIG. 3, including (a) and (b), is a diagram showing a control plane and a user plane of a radio interface protocol between a UE and an E-UTRAN based on a 3GPP radio access network standard. The control plane of FIG. 3(a) refers to a path used for transmitting control messages used for managing a call between the UE and the E-UTRAN. The user plane of FIG. 3(b) refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
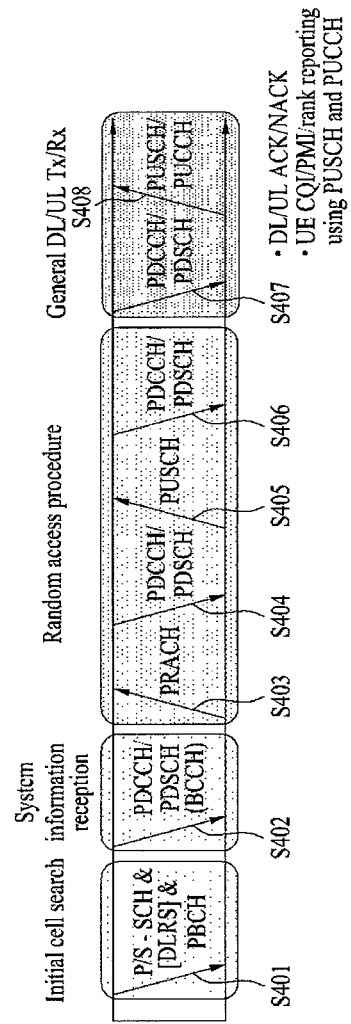
FIG. 4 is a diagram showing physical channels used in a 3GPP system and a general signal transmission method using the same.

FIG. 4 is a diagram showing physical channels used in a 3GPP system and a general signal transmission method using the same.

When a UE is powered on or enters a new cell, the UE performs an initial cell search operation such as synchronization with an eNB (S401). To this end, the UE may receive a primary synchronization channel (P-SCH) and a secondary synchronization channel (S-SCH) from the eNB to perform synchronization with the eNB and acquire information such as a cell ID. Then, the UE may receive a physical broadcast channel from the eNB to acquire broadcast information in the cell. During the initial cell search operation, the UE may receive a downlink reference signal (DL RS) so as to confirm a downlink channel state.

After the initial cell search operation, the UE may receive a physical downlink control channel (PDCCH) and a physical downlink control channel (PDSCH) based on information included in the PDCCH to acquire more detailed system information (S402).

When the UE initially accesses the eNB or has no radio resources for signal transmission, the UE may perform a random access procedure (RACH) with respect to the eNB (steps S403 to S406). To this end, the UE may transmit a specific sequence as a preamble through a physical random access channel (PRACH) (S403) and receive a response message to the preamble through the PDCCH and the PDSCH corresponding thereto (S404). In the case of contention-based RACH, the UE may further perform a contention resolution procedure.

After the above procedure, the UE may receive PDCCH/PDSCH from the eNB (S407) and may transmit a physical uplink shared channel (PUSCH)/physical uplink control channel (PUCCH) to the eNB (S408), which is a general uplink/downlink signal transmission procedure. Particularly, the UE receives downlink control information (DCI) through the PDCCH. Here, the DCI includes control information such as resource allocation information for the UE. Different DCI formats are defined according to different usages of DCI.

Control information transmitted from the UE to the eNB in uplink or transmitted from the eNB to the UE in downlink includes a downlink/uplink acknowledge/negative acknowledge (ACK/NACK) signal, a channel quality indicator (CQI), a precoding matrix index (PMI), a rank indicator (RI), and the like. In the case of the 3GPP LTE system, the UE may transmit the control information such as CQI/PMI/RI through the PUSCH and/or the PUCCH.

Figure 5:
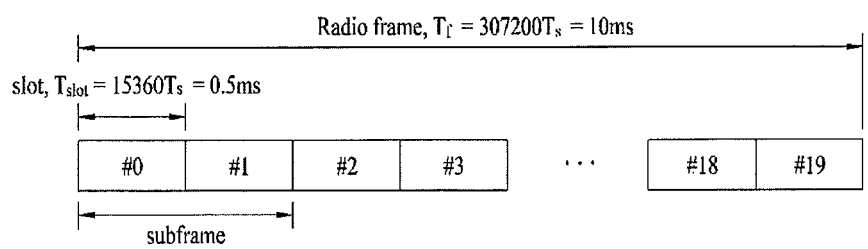
FIG. 5 is a diagram showing the structure of a radio frame used in a Long Term Evolution (LTE) system.

FIG. 5 is a diagram showing the structure of a radio frame used in an LTE system.

Referring to FIG. 5, the radio frame has a length of 10 ms ($327200 \times T_s$) and is divided into 10 subframes having the same size. Each of the subframes has a length of 1 ms and includes two slots. Each of the slots has a length of 0.5 ms ($15360 \times T_s$). Ts denotes a sampling time, and is represented by $T_s = 1/(15 \text{ kHz} \times 2048) = 3.2552 \times 10^{-8}$ (about 33 ns). Each of the slots includes a plurality of OFDM symbols in a time domain and a plurality of Resource Blocks (RBs) in a frequency domain. In the LTE system, one RB includes 12 subcarriers×7 (or 6) OFDM symbols. A transmission time interval (TTI) that is a unit time for transmission of data may be determined in units of one or more subframes. The structure of the radio frame is purely exemplary and thus the number of subframes included in the radio frame, the number of slots included in a subframe, or the number of OFDM symbols included in a slot may be changed in various ways.

Figure 6:
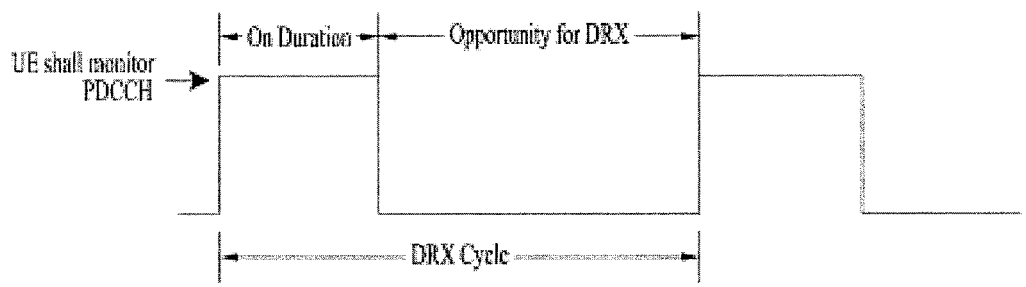
FIG. 6 is a diagram showing a concept DRX (Discontinuous Reception).

FIG. 6 is a diagram showing a concept DRX (Discontinuous Reception).

Referring to FIG. 6, if DRX is set for a UE in RRC_CONNECTED state, the UE attempts to receive a downlink channel, PDCCH, that is, performs PDCCH monitoring only during a predetermined time period, while the UE does not perform PDCCH monitoring during the remaining time period. A time period during which the UE should monitor a PDCCH is referred to as "On Duration". One On Duration is defined per DRX cycle. That is, a DRX cycle is a repetition period of On Duration.

The UE always monitors a PDCCH during On Duration in one DRX cycle and a DRX cycle determines a period in which On Duration is set. DRX cycles are classified into a long DRX cycle and a short DRX cycle according to the periods of the DRX cycles. The long DRX cycle may minimize the battery consumption of a UE, whereas the short DRX cycle may minimize a data transmission delay.

When the UE receives a PDCCH during On Duration in a DRX cycle, an additional transmission or a retransmission may take place during a time period other than the On Duration. Therefore, the UE should monitor a PDCCH during a time period other than the On Duration. That is, the UE should perform PDCCH monitoring during a time period over which an inactivity managing timer, drx-InactivityTimer or a retransmission managing timer, drx-RetransmissionTimer as well as an On Duration managing timer, onDurationTimer is running.

The value of each of the timers is defined as the number of subframes. The number of subframes is counted until the value of a timer is reached. If the value of the timer is satisfied, the timer expires. The current LTE standard defines drx-InactivityTimer as a number of consecutive PDCCH-subframes after successfully decoding a PDCCH indicating an initial UL or DL user data transmission and defines drx-RetransmissionTimer as a maximum number of consecutive PDCCH-subframes for as soon as a DL retransmission is expected by the UE.

Additionally, the UE should perform PDCCH monitoring during random access or when the UE transmits a scheduling request and attempts to receive a UL grant.

A time period during which a UE should perform PDCCH monitoring is referred to as an Active Time. The Active Time includes On Duration during which a PDCCH is monitored periodically and a time interval during which a PDCCH is monitored upon generation of an event.

More specifically, the Active Time includes the time while (1) onDurationTimer or drx-InactivityTimer or drx-RetransmissionTimer or mac-ContentionResolutionTimer is running, or (2) a Scheduling Request is sent on PUCCH and is pending, or (3) an uplink grant for a pending HARQ retransmission can occur and there is data in the corresponding HARQ buffer, or (4) a PDCCH indicating a new transmission addressed to the C-RNTI of the UE has not been received after successful reception of a Random Access Response for the preamble not selected by the UE.

Figure 7:
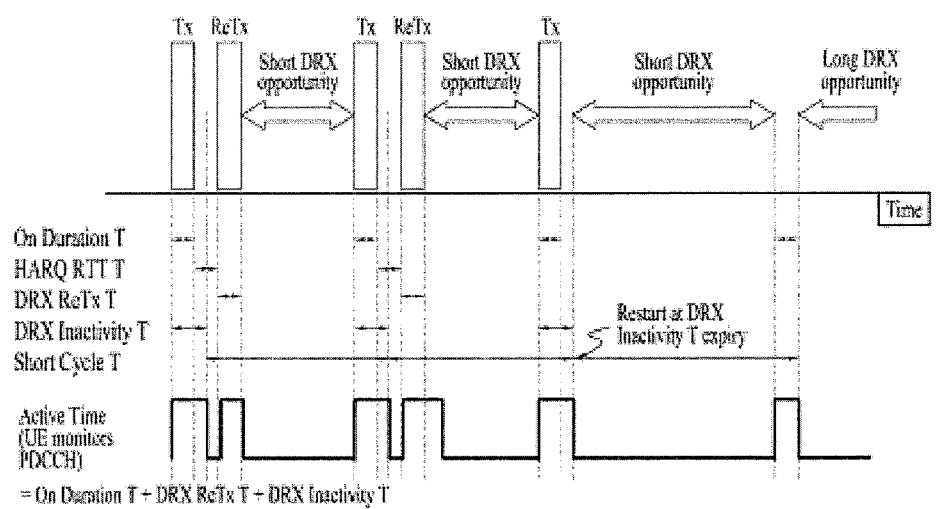
FIG. 7 is a diagram showing a method for a DRX operation in the LTE system.

FIG. 7 is a diagram showing a method for a DRX operation in the LTE system.

Referring to FIG. 7, the UE may be configured by RRC with a DRX functionality and shall perform following operations for each TTI (that is, each subframe).

If a HARQ RTT (Round Trip Time) Timer expires in this subframe and the data of the corresponding HARQ process was not successfully decoded, the UE shall start the drx-RetransmissionTimer for the corresponding HARQ process.

Further, if a DRX Command MAC control element (CE) is received, the UE shall stop onDurationTimer and drx-InactivityTimer. The DRX Command MAC CE is a command for shifting to a DRX state, and is identified by a LCID (Logical Channel ID) field of a MAC PDU (Protocol Data Unit) subheader.

Further, in case that drx-InactivityTimer expires or a DRX Command MAC CE is received in this subframe, if the Short DRX cycle is configured, the UE shall start or restart drx-ShortCycleTimer, and use the Short DRX Cycle. However, if the Short DRX cycle is not configured, the Long DRX cycle is used. Additionally, if drxShortCycleTimer expires in this subframe, the Long DRX Cycle is also used.

Furthermore, if the Short DRX Cycle is used and [(SFN*10)+subframe number] modulo (shortDRX-Cycle) is (drxStartOffset) modulo (shortDRX-Cycle), or if the Long DRX Cycle is used and [(SFN*10)+subframe number] modulo (longDRX-Cycle) is drxStartOffset, the UE shall start onDurationTimer.

The UE shall monitor the PDCCH for a PDCCH-subframe during the Active Time. If the PDCCH indicates a DL transmission or if a DL assignment has been configured for this subframe, the UE shall start the HARQ RTT Timer for the corresponding HARQ process and stop the drx-RetransmissionTimer for the corresponding HARQ process. If the PDCCH indicates a (DL or UL) new transmission, the UE shall start or restart drx-InactivityTimer.

Here, the PDCCH-subframe is defined as a subframe with PDCCH. That is, the PDCCH-subframe is a subframe on which the PDCCH can be transmitted. More specifically, in a FDD (frequency division duplex) system, the PDCCH-subframe represents any subframe. For full-duplex TDD (time division duplex) system, the PDCCH-subframe represents the union of downlink subframes and subframes including DwPTS of all serving cells, except serving cells that are configured with schedulingCellId (that is, the Scheduled cell). Here, the schedulingCellId indicates an identity of the scheduling cell. Further, for half-duplex TDD system, the PDCCH-subframe represents the subframes where the PCell (primary cell) is configured as a downlink subframe or a subframe including DwPTS.

Meanwhile, when not in Active Time, the UE does not perform a SRS (Sounding Reference Signal) transmission and a CSI reporting, which are triggered by the eNB.

During the above DRX operation, only the HARQ RTT Timer is fixed to 8 ms, whereas the eNB indicates the other timer values, onDurationTimer, drx-InactivityTimer, drx-RetransmissionTimer, and mac-ContentionResolutionTimer to the UE by an RRC signal. The eNB also indicates a long DRX cycle and a short DRX cycle, which represent the period of a DRX cycle, to the UE by an RRC signal.

Here, a random access procedure in a LTE system is examplained with regards to another timer, contention resolution timer.

Figure 8:
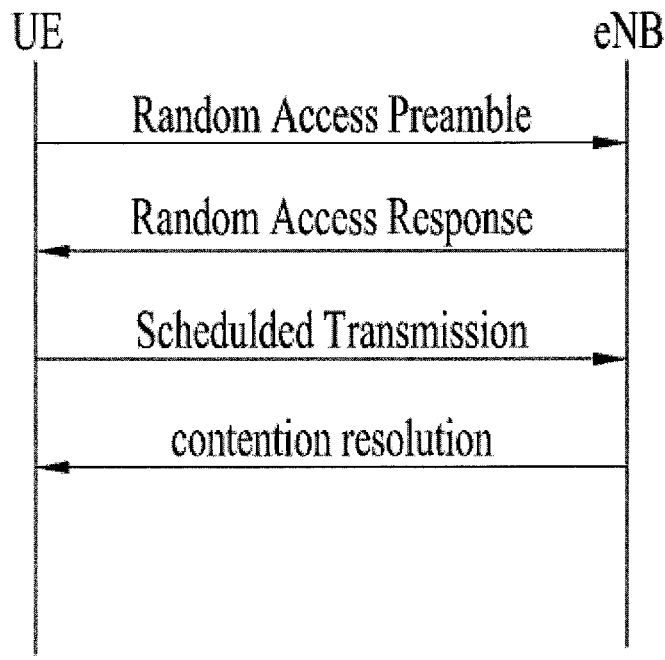
FIG. 8 is a diagram explaining a random access procedure.

FIG. 8 is a diagram explaining a random access procedure.

When a UE wishes to access the network and determines a message to be transmitted, the message may be linked to a purpose and a cause value may be determined. The size of the ideal message number 3 illustrated in FIG. 8 may also be determined by identifying all optional information and different alternative sizes, such as by removing optional information, or an alternative "scheduling request" message may be used.

The UE acquires necessary information for the transmission of the preamble. In response to the random access preamble transmission by the UE, eNB may respond by transmitting a random access response. The transmission by a UE is not a scheduled one, so there might be a contention with another UE. Therefore, the random access procedure further comprises contention resolution procedure by transmitting a message 3 (msg3) as scheduled transmission by the UE and receiving contention resolution message from eNB.

Contention Resolution is based on either C-RNTI on PDCCH of the PCell or UE Contention Resolution Identity on DL-SCH. According to a LTE standard, this contention resolution is controlled based on a MAC contention resolution timer (mac-ContentionResolutionTimer).

Once Msg3 is transmitted, the UE may start mac-ContentionResolutionTimer and restart mac-ContentionResolutionTimer at each HARQ retransmission. After that, regardless of the possible occurrence of a measurement gap, the UE may monitors the PDCCH until mac-ContentionResolutionTimer expires or is stopped.

If notification of a reception of a PDCCH transmission is received from lower layers, and if appropriate contention resolution message is received, the UE may stop mac-ContentionResolutionTimer and consider this Random Access procedure successfully completed.

However, before the above mentioned event occurs, if mac-ContentionResolutionTimer expires, the UE may consider the Contention Resolution not successful.

When the UE is configured with DRX, the UE may save power consumption by discontinuously monitoring the PDCCH indicating UL or DL data transmission. The DRX operation is specified by the DRX-config IE in the RRC signalling, which includes onDurationTimer, drx-InactivityTimer, drx-RetransmissionTimer, drxStartOffset, shortDRX-cycle, and drxShortCycleTimer. The value of DRX related timers are configured by RRC signalling considering the traffic and scheduling policy.

According to the current technical standard, each of the timers associated with the DRX operation (e.g. onDurationTimer, drx-InactivityTimer, drx-RetransmissionTimer, drx-StartOffset, shortDRX-cycle, and drxShortCycleTimer) has its own triggering event. So, when eNB transmits a value (X) for a specific timer at subframe n, it may expect that timer will work from the subframe n to subframe n+X−1. However, in some situations, the UE receiving the value (X) needs time for processing the received signal, so the timer may not start at subframe n. Contrary to this, eNB may expect the timer starts from subframe n+1 to subframe n+X while the UE actually starts the timer from subframe n to subframe n+X−1. This may be a problem for certain situation, and it will be specifically discussed with an example of drx-Inactivity Timer.

DRX Inactivity Timer

Figure 9:
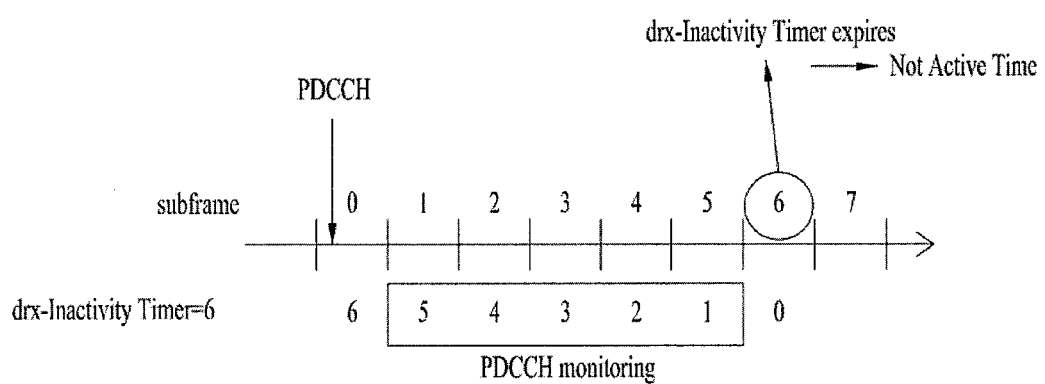
FIG. 9 is a diagram showing an example of the problems to be solved by the present invention.

FIG. 9 is a diagram showing an example of the problems to be solved by the present invention.

When the eNB configures the drx-InactivityTimer with specific time duration by RRC signalling, the UE is expected to be in Active Time to monitor a PDCCH indicating UL or DL data transmission for the time duration specified by RRC signalling after receiving the PDCCH indicating UL or DL data transmission from the eNB. If it is assumed that there is only drx-InactivityTimer running, when the eNB configures the drx-InactivityTimer of psf6 (X=6) and receives the PDCCH indicating UL or DL data transmission in the subframe n, the eNB expects that the UE is in Active Time and monitors the PDCCH indicating UL or DL data transmission from $n+1^{th}$ subframe to $n+6^{th}$ subframe. However, in the current MAC specification, the UE is not in Active Time in $n+6^{th}$ subframe and does not monitor the PDCCH in the $n+6^{th}$ subframe.

It is problematic that there is misalignment between the eNB and the UE because the eNB schedules in the $n+6^{th}$ subframe for the UE while the UE does not monitor the PDCCH the $n+6^{th}$ subframe, which results in loss of the PDCCH. The reason why misalignment between the eNB and the UE occurs in the subframe where the drx-InactivityTimer is to expire is that the drx-InactivityTimer expires before the UE monitors the PDCCH indicating UL or DL data transmission from the eNB in the subframe. Since the UE is in not in Active Time when drx-InactivityTimer is not running (given that there is no other DRX related timers running), the UE does not monitor the PDCCH in the subframe where the drx-InactivityTimer is to expire.

Similar problem can be occur for the other timers.

DRX Retransmission Timer

When the eNB configures the UE with DRX functionality and sets the drx-RetransmissionTimer with specific time duration by RRC signalling, the eNB expects that the UE is in non-Active Time and does not monitors the PDCCH indicating UL or DL data transmission upon the expiry of drx-RetrnasmissionTimer. However, in current MAC specification, it is unclear whether the UE is Active Time or not in the subframe where the drx-RetransmissionTimer expires.

On Duration Timer

When the eNB configures the UE with DRX functionality and sets the onDurationTimer with specific time duration by RRC signalling, the eNB expects that the UE is in non-Active Time and does not monitors the PDCCH indicating UL or DL data transmission upon the expiry of onDurationTimer. However, in current MAC specification it is unclear whether the UE is Active Time or not in the subframe where the onDurationTimer expires.

MAC Contention Resolution Timer

When the eNB configures RACH configuration and sets the mac-ContentionResolutionTimer with specific time duration by RRC signalling, the UE is expected to monitor the PDCCH until mac-ContentionResolutionTimer expires or is stopped regardless of the possible occurrence of a measurement gap. In addition, the eNB expects that the UE is in non-Active Time and does not monitors the PDCCH indicating UL or DL data transmission upon the expiry of mac-ContentionResolutionTimer. However, in current MAC specification it is unclear whether the UE is Active Time or not in the subframe where the mac-ContentionResolutionTimer expires.

One may think that, if we predefine the starting point of all the timers as subframe n+1 when the triggering event occurs at subframe n, the above problem can be easily solved. However, in some situation, based on the characteristic of each timer, this may not work. The better approach may be predefining the starting subframe considering the characteristics of each timer.

Therefore, the present embodiment is characterized by categorizing the above timers associated with DRX operation into two categories. For the first category timer or a first timer, the UE starts the first timer and monitors the PDCCH from subframe n+1 to subframe n+X, when a triggering event for starting the first timer occurs at the subframe n. For the second category timer or a second timer, the UE starts the second timer and monitors the PDCCH from subframe n to subframe n+X−1, when a triggering event for starting the first timer occurs at the subframe n.

The above categorizing may be based on the determination on whether there needs any immediate processing of the UE.

If an immediate processing of the UE is required for a specific timer, it is better to predefine that the specific timer starts from subframe n+1. On the other hand, if there is no need for immediate processing of the UE, it is better to predefine that the specific timer starts from subframe n and finish early.

Following explanation is for categorizing the timers based on its characteristics.

DRX Inactivity Timer

As explained earlier, the triggering event for drx-Inactivity timer is receiving a PDCCH indicating a new transmission (DL or UL). The UE is required to start monitoring PDCCH based on drx-Inactivity timer after receiving the PDCCH indicating that new transmission. However, in order for the UE to recognize the reception of PDCCH indicating the new transmission, the UE has to decode the received PDCCH. Thus, it is proposed that the drx-Inactivity timer is categorized as the first timer and the UE starts monitoring PDCCH from subframe n+1.

It should be noted that starting the drx-Inactivity timer and starting the monitoring the PDCCH is not necessarily synchronized. For example, the drx-Inactivity Timer may starts from subframe n while the UE starts monitoring the PDCCH from subframe n+1. The present embodiment is focusing the actual operation of the UE (e.g. monitoring PDCCH rather than starting the drx-Inactivity Timer).

Therefore, according to the present embodiment, when the received value for drx-Inactivity timer is represented as Xdit and the PDCCH indicating new UL/DL transmission, the UE starts to monitor the PDCCH from subframe n+1 to subframe n+Xdit. It should be noted that making the UE to monitor the PDCCH at subframe x+Xdit may address the problem mentioned with regards to FIG. 9. Also, the drx-Inactivity Timer itself may starts from subframe n or subframe n+1, that is, it is less impotent for the UE operation.

MAC Contention Resolution Timer

As stated above, once the UE transmits the message 3 of the random access procedure, the UE may starts mac-ContentionResolutionTimer. After it, the UE will monitor the PDCCH until the macContentionResolutionTimer expires, regardless of the possible occurrence of a measurement gap.

So, the triggering event for starting mac-ContentionResolution Timer is transmitting the message 3 of the random access procedure. In order for transmitting the message 3, the UE needs time. So, it is proposed max-contention Resolution Timer is also categorized as the first timer, thereby the UE starts monitoring the PDCCH from subframe n+1.

Therefore, the UE according to the present embodiment starts to monitor the PDCCH from subframe n+1 to subframe n+Xmcrt, if the message 3 was transmitted at subframe n and the value for the mac-Contention Resolution Timer is set as Xmcrt.

HARQ RTT Timer & DRX Retransmission Timer

As stated above, if the PDCCH indicates a DL transmission or if a DL assignment has been configured for subframe n, the UE may start the HARQ RTT Timer for the corresponding HARQ process and stop the drx-RetransmissionTimer for the corresponding HARQ process.

And, when HARQ RTT timer expires at the subframe n and data of a corresponding HARQ process was not successfully decoded, the UE may start monitoring the PDCCH.

Regarding the drx-retransmission timer, the UE is required to start monitoring PDCCH after expiration of HARQ RTT Timer. So, there is no need for the UE's immediate operation. So, drx-Retransmission Timer is categorized as the second timer and the UE starts monitoring the PDCCH from subframe n. It should be noted that if we represent the triggering event for starting drx-Retransmission timer occurs at subframe n and the value for HARQ RTT is represented as Xrtt, the triggering event for starting HARQ RTT timer occurs at subframe n-Xrtt.

On DurationTimer and DRX Short Cycle Timer

As explained before, if drx-InactivityTimer expires or a DRX Command MAC control element is received in subframe n, the UE depends on DRX cycle. This Drx cycle is based on either long DRX cycle or short DRX cycle. For example, if the Short DRX cycle is configured, the UE may start or restart drxShortCycleTimer and use the Short DRX Cycle. On the other hand, if the short DRX cycle is not configured the UE may use the Long DRX cycle. Further, if drxShortCycleTimer expires, the UE may use the Long DRX cycle.

After determining that if a system frame number (SFN) meets a predetermined condition based on either the short DTX cycle or the long DRX cycle, the UE may start onDurationTimer. Specifically, (1) if the Short DRX Cycle is used and [(SFN*10)+subframe number] modulo (shortDRX-Cycle)=(drxStartOffset) modulo (shortDRX-Cycle); or (2) if the Long DRX Cycle is used and [(SFN*10)+subframe number] modulo (longDRX-Cycle)=drxStartOffset, the UE may start onDurationTimer.

As explained earlier, during the Active Time, for a PDCCH-subframe, if the subframe is not required for uplink transmission for half-duplex FDD UE operation and if the subframe is not part of a configured measurement gap, the UE may monitor the PDCCH.

The above explanation shows that there is no need for the UE's immediate operation after triggering events for onDurationTimer and drxShortCycleTimer occur. Thus, these timers can be categorized as the second timer. That is, the UE monitors PDCCH in PDCCH-subframes from subframe n to subframe n+Xodt−1, when the SFN meet the above mentioned condition based on either the long DRX cycle or short DRX cycle at subframe n, and the value for the On Duration Timer is represented as Xodt.

Also, the UE may use the short DRX cycle from subframe n to subframe n+Xdsct−1, when drx-InactivityTimer expires or a DRX Command MAC control element is received in subframe n, and the value for the drxShortCycle Timer is represented as Xdsct.

When a DRX timer is set to a value of X, and n denotes the subframe in which the related event is triggered, the intended behaviours of each DRX timer can be summarized as Table 1 below.

TABLE 1

| DRX Timers | Intended UE behaviour ([x, y] means including subframe x and y) |
|---|---|
| drx-InactivityTimer | The UE monitors PDCCH in PDCCH-subframes during the subframes [n + 1, n + X]. |

TABLE 1-continued

| DRX Timers | Intended UE behaviour ([x, y] means including subframe x and y) |
|---|---|
| | The UE starts or restarts drxShortCycleTimer, and uses Short DRX Cycle in the subframe n + X + 1, if configured. |
| mac-ContentionResolutionTimer | The UE monitors PDCCH in PDCCH-subframes during the subframes [n + 1, n + X]. |
| drx-RetransmissionTimer | The UE monitors PDCCH in PDCCH-subframes during the subframes [n, n + X − 1]. |
| onDurationTimer | The UE monitors PDCCH in PDCCH-subframes during the subframes [n, n + X − 1]. |
| drxShortCycleTimer | The UE uses the Short DRX Cycle during the subframes [n, n + X − 1]. The UE starts to use the Long DRX Cycle in the subframe n + X. |
| HARQ RTT Timer | The UE starts drx-RetransmissionTimer in the subframe n + X, if needed. |

The above explanation is focusing a situation when the wireless communication system is working in FDD scheme. But, when the wireless communication system is working in TDD scheme slight modification is required.

Figure 10:
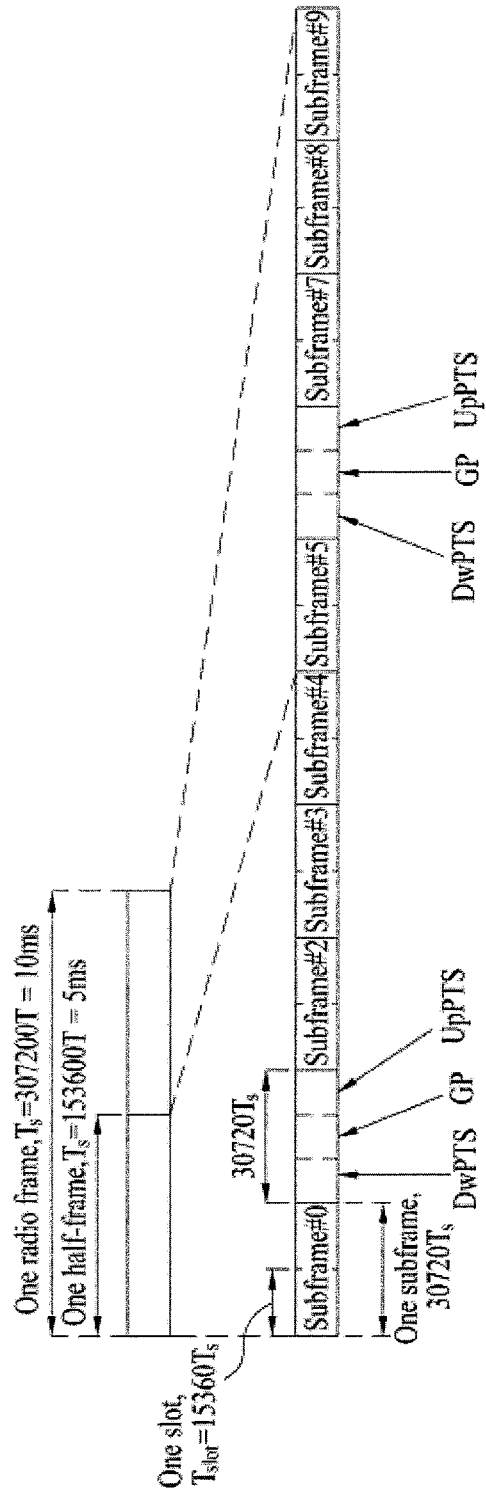
FIG. 10 is a diagram explaining a situation in TDD system.

FIG. 10 is a diagram explaining a situation in TDD system.

In LTE TDD system, the radio frame includes two half frames, each of which includes normal subframes and a special subframe. The normal subframe includes two slots and the special subframe includes a downlink pilot time slot (DwPTS), a guard period (GP), and an uplink pilot time slot (UpPTS).

In the special subframe, DwPTS is used for initial cell search, synchronization or channel estimation at the user equipment. UpPTS is used to synchronize channel estimation at the base station with uplink transmission of the user equipment. In other words, DwPTS is used for downlink transmission, and UpPTS is used for uplink transmission. In particular, UpPTS is used for PRACH preamble or SRS transmission. Also, the guard period is to remove interference occurring in the uplink due to multipath delay of downlink signals between the uplink and the downlink.

The current 3GPP standard document defines the special subframe as illustrated in Table 2 below. In Table 2, $T_s = 1/(15000 \times 2048)$ represents DwPTS and UpPTS, and the other region is set to the guard period.

Meanwhile, the structure of the radio frame, that is, UL/DL configuration in the TDD system is as illustrated in Table 3 below.

TABLE 3

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 3, D indicates a downlink subframe, U indicates an uplink subframe, and S means the special subframe. Also, the above Table 3 represents a downlink-uplink switching period of uplink/downlink subframe configuration in each system.

As shown in FIG. 10, not all subframes include PDCCH. Thus, the above Table 1 should be modified as Table 4 below.

TABLE 4

| DRX Timers | Intended UE behaviour ([x, y] means including subframe x and y) |
|---|---|
| drx-InactivityTimer | The UE monitors PDCCH in PDCCH-subframes during the subframes [n + 1, n + m]. The UE starts or restarts drxShortCycleTimer, and uses Short DRX Cycle in the subframe n + m + 1, if configured. |
| mac-ContentionResolutionTimer | The UE monitors PDCCH in PDCCH-subframes during the subframes [n + 1, n + X]. |
| drx-RetransmissionTimer | The UE monitors PDCCH in PDCCH-subframes during the subframes [n, n + m − 1]. |
| onDurationTimer | The UE monitors PDCCH in PDCCH-subframes during the subframes [n, n + m − 1]. |
| drxShortCycleTimer | The UE uses the Short DRX Cycle during the subframes [n, n + X − 1]. The UE starts to use the Long DRX Cycle in the subframe n + X. |

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

TABLE 4-continued

| DRX Timers | Intended UE behaviour<br>([x, y] means including subframe x and y) |
|---|---|
| HARQ RTT Timer | The UE starts drx-RetransmissionTimer in the subframe n + X, if needed. |

NOTE:
For FDD, m is equal to X; for TDD, m is equal to the minimum number of subframes so that X PDCCH-subframes are included during the subframes [x, y].

That is, for FDD, m is equals to X. That is, there is no need for modification. But, for TDD, m is equals to the minimum number of subframes so that X PDCCH-subframes are included during the subframes [x, y].

Figure 11:
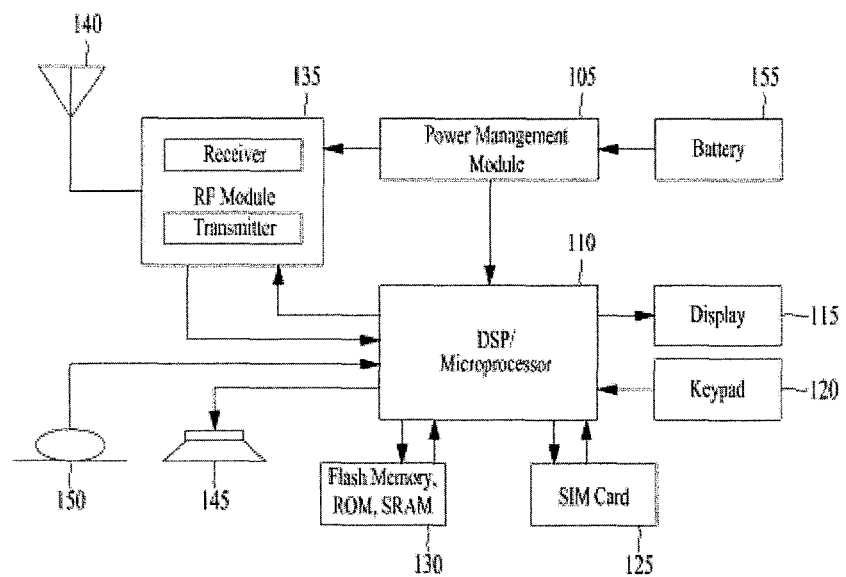
FIG. 11 is a block diagram of a communication apparatus according to an embodiment of the present invention.

FIG. 11 is a block diagram of a communication apparatus according to an embodiment of the present invention.

The apparatus shown in FIG. 11 can be a user equipment (UE) adapted to perform the above power saving mechanism, but it can be any apparatus for performing the same operation.

As shown in FIG. 11, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, the microprocessor (110) is adapted to control the transceiver (135) to monitor the PDCCH from subframe n+1 to subframe n+X based on a first timer among timers related with DRX operation, when a first event for starting the first timer occurs at the subframe n. On the other hand, the microprocessor (110) is adapted to control the transceiver (135) to monitor the PDCCH from subframe n to subframe n+X−1 based on a second timer among said timers, when a second event for starting the second timer occurs at the subframe n.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for a user equipment (UE) with regards to a discontinuous reception (DRX) functionality in a wireless communication system, the method comprising:
   receiving a value for a timer related with DRX operation from a network; and
   monitoring a physical downlink control channel (PDCCH) during a period including X PDCCH subframes based on the timer,
   wherein the received value for the timer is X,
   wherein each of the PDCCH subframes is a subframe where the PDCCH can be received, and
   wherein the period starts at subframe n+1, when an event for starting the timer occurs at the subframe n.

2. The method of claim 1, wherein the event comprises receiving a PDCCH indicating a new transmission, and
   wherein the timer comprises a DRX inactivity timer.

3. The method of claim 1, wherein the event comprises transmitting a message 3 of a random access procedure, and
   wherein the timer comprises a medium access control (MAC) contention resolution timer.

4. The method of claim 1, wherein the event does not comprise an event that a hybrid automatic repeat request (HARQ) retransmission timer (RTT) expires at the subframe n and data of a corresponding HARQ process was not successfully decoded, and
   wherein the timer does not comprise a DRX retransmission timer.

5. The method of claim 1, wherein the event does not comprise an event that a system frame number meets a predetermined condition with regards to a DRX cycle, and
   wherein the timer does not comprise on duration timer.

6. A user equipment (UE) for operating in a wireless communication system, the UE comprising:
   a transceiver adapted to transmit or receive signals over the air; and
   a microprocessor electrically connected to the transceiver and adapted to control the transceiver to:
   monitor a physical downlink control channel (PDCCH) during a period including X PDCCH subframes based on a timer,
   wherein a value for the timer received by the transceiver from the network is X, wherein each of the PDCCH subframes is a subframe where the PDCCH can be received, and
   wherein the period starts at subframe n+1, when an event for starting the timer occurs at the subframe n.

7. The UE of claim 6, wherein the processor is configured to consider that the event occurs when receiving a PDCCH indicating a new transmission, and
   wherein the timer comprises a DRX inactivity timer.

8. The UE of claim 6, wherein the processor is configured to consider that the event occurs when transmitting a message 3 of a random access procedure, and
   wherein the timer comprises a medium access control (MAC) contention resolution timer.

9. The UE of claim 6, wherein the processor is configured to consider that the event does not occur when a hybrid automatic repeat request (HARQ) retransmission timer (RTT) expires at the subframe n and data of a corresponding HARQ process was not successfully decoded, and
   wherein the timer does not comprise a DRX retransmission timer.

10. The UE of claim 6, wherein the processor is configured to consider that the event does not occur when a system frame number meets a predetermined condition with regards to a DRX cycle, and
   wherein the timer does not comprise on duration timer.

* * * * *